Jan. 15, 1924.  1,480,990

T. M. BRUECK

ADJUSTING MECHANISM

Filed March 7, 1922

INVENTOR.
Theodore M. Brueck
BY
Davis & Simms
ATTORNEYS.

Patented Jan. 15, 1924.

1,480,990

UNITED STATES PATENT OFFICE.

THEODORE M. BRUECK, OF ROCHESTER, NEW YORK, ASSIGNOR TO ILEX OPTICAL COMPANY, OF ROCHESTER, NEW YORK, A CORPORATION OF NEW YORK.

ADJUSTING MECHANISM.

Application filed March 7, 1922. Serial No. 541,886.

*To all whom it may concern:*

Be it known that I, THEODORE M. BRUECK, a citizen of the United States, and resident of Rochester, in the county of Monroe and State of New York, have invented certain new and useful Improvements in Adjusting Mechanisms, of which the following is a specification.

The present invention relates to adjusting mechanisms having two parts, one of which is in the form of a tube or sleeve in which the other fits and is adjustable therein, an object of this invention being to provide an adjusting mechanism which is compact in form, easy to operate, durable in use and inexpensive to manufacture.

To these and other ends, the invention consists of certain parts and combinations of parts, all of which will be hereinafter described; the novel features being pointed out in the appended claims.

Figure 1:
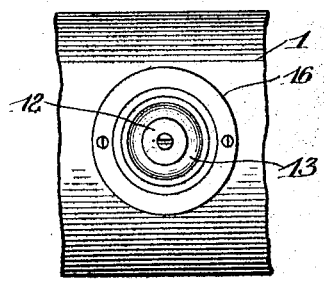
Fig. 1 is a side view of one of the parts showing the exterior of the adjusting mechanism.
Figure 2:
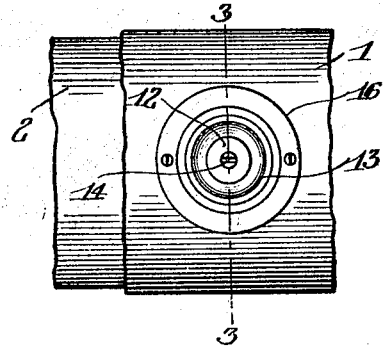
Fig. 2 is a similar view showing the other part adjusted therein.
Figure 3:
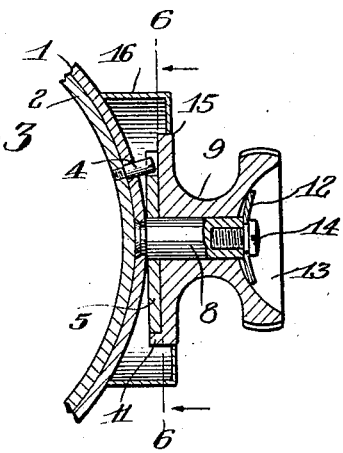
Fig. 3 is a section on the line 3—3, Fig. 2.
Figure 4:
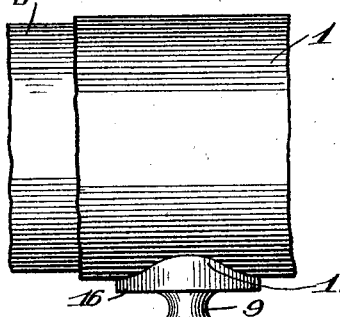
Fig. 4 is an other view of the adjusting mechanism.
Figure 5:
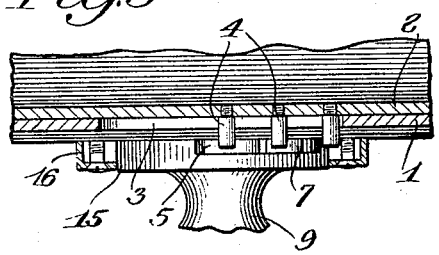
Fig. 5 is a section on the line 5—5, Fig. 6.
Figure 6:
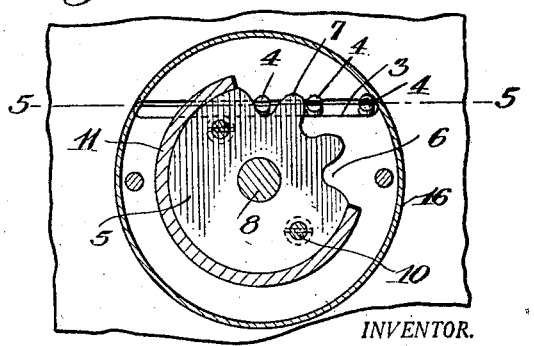
Fig. 6 is a section on the line 6—6, Fig. 3.

In the illustrated embodiment, 1 indicates a sleeve or tube having operable therein a member 2, which may also be in the form of a tube, this telescoping arrangement being present in telescopes, microscopes and other optical instruments. The outer tubular member 1 is provided with a longitudinal extending slot 3 and operating in this slot is a plurality of projections 4 arranged in alinement with each other longitudinally of the tube 1 said projections being detachably secured to the inner member by screw threaded ends 4ª. These projections serve as teeth with which an operating gear on the exterior of the member 1 may cooperate and also serve to guide the inner member in a straight line.

The operating gear in the illustrated embodiment is in the form of a disk 5 provided with notches 6 in its periphery to form teeth 7, the notches receiving the projections 4 and the teeth operating between said projections 4. This operating gear is mounted to turn about an axis which extends radially of the tube 1 and to this end the latter has a pivot pin or projection 8 secured thereto and projecting outwardly therefrom at one side of the slot 3. On this pivot pin 8, a thumb wheel 9 is mounted to turn, said thumb wheel having the operating gear or disk secured by screws or fasteners 10 to the inner end thereof within an arcuate flange 11 formed at such inner end. The thumb wheel may be held on the pivot pin 8 by a spring disk or washer 12 fitting in a pocket 13 in said thumb wheel and held to the pivot pin 8 by a screw or fastener 14 to exert pressure on the thumb wheel in order to hold the disk or gear 5 with yielding pressure against the sleeve 1 about the pivot pin 8.

The inner end of the thumb wheel is formed cylindrically at 15 and has a greater diameter than the gear 5. With this cylindrical portion of the thumb wheel, a housing 16 cooperates, this housing being in the form of a cup shaped member with its edges curved at 17 to conform to the cylindrical portion of the tube 1, so as to enclose the slot 5 and those portions of the operating mechanism below the cylindrical portion 15 of the thumb wheel.

From the foregoing it will be seen that there has been provided an adjusting mechanism for two parts, one of which fits within the other, this adjusting mechanism being compact in form, durable in use, simple in operation and inexpensive to manufacture. Pins on the inner member operate through a longitudinally extending slot on the outer member and guide the inner member in a straight line axially of the outer member without any turning movement. The operating gear is in the form of a disk which may be readily formed in a punch press. This operating gear is mounted at the inner end of a thumb wheel and a housing cooperates with the thumb wheel and the outer member or tube to enclose the operating gear and the slot in the outer member.

What I claim as my invention and desire to secure by Letters Patent is:

1. The combination with two tubular members, one of which receives the other and is provided with a longitudinally extending slot, of spaced pins projecting from the inner member through the slot and cooperating with the walls of the slot to guide the inner member longitudinally of the outer member and prevent the relative turning between the two members, and a rotary operating member mounted to turn on the outer member about an axis substantially radial to the axis of the tubular members and cooperating with said spaced projections to effect the movement of the inner member relatively to the outer member.

2. The combination with two members, one of which has the other operating therein and is provided with a longitudinally extending slot, of spaced projections on the inner member extending through said slot, and a disk-like gear mounted on the outer member to turn about an axis intersecting said outer member and having teeth cooperating with the projections to move the inner member longitudinally of the outer member.

3. The combination with an outer tube provided with a longitudinally extending slot, and an inner member operating in said tube, of aligned spaced pins projecting from said inner member and operating in the slot, a shaft extending from said outer member, a thumb wheel mounted to turn on said shaft, and a gear turning with said thumb wheel at the inner end of the latter and meshing with said pins.

4. The combination with two members, one of which receives the other and is provided with a longitudinally extending slot, of spaced projections extending from the inner member through said slot, a thumb wheel mounted to turn on said outer member, a gear in the inner end of the thumb wheel cooperating with said spaced projections, and a housing secured to the outer member and surrounding said thumb wheel to enclose the slot and the gear.

5. The combination with two members, one of which receives the other and is provided with a longitudinally extending slot, of pins on the inner member guided by the walls of the slot and arranged in a line extending longitudinally of the slot, a shaft projecting outwardly from the inner member, a thumb wheel turning on said shaft and having a cylindrically formed portion near its inner end, a gear secured to said thumb wheel and meshing with the pins on the inner member, and a housing secured to said outer member over the slot and fitting closely about the cylindrically formed portion near the inner end of the thumb wheel.

THEODORE M. BRUECK.